(12) United States Patent
Komatsubara et al.

(10) Patent No.: US 11,501,927 B2
(45) Date of Patent: Nov. 15, 2022

(54) ALKALI METAL ION CAPACITOR

(71) Applicant: JTEKT CORPORATION, Osaka (JP)

(72) Inventors: Yukihiro Komatsubara, Osaka (JP); Takumi Mio, Osaka (JP); Kentaro Iizuka, Osaka (JP); Takafumi Fujii, Osaka (JP); Koji Nishi, Osaka (JP); Naoki Ohmi, Osaka (JP); Yusuke Kimoto, Osaka (JP)

(73) Assignee: JTEKT CORPORATION, Kariya (JP)

( * ) Notice: Subject to any disclaimer, the term of this patent is extended or adjusted under 35 U.S.C. 154(b) by 0 days.

(21) Appl. No.: 17/051,949

(22) PCT Filed: Apr. 26, 2019

(86) PCT No.: PCT/JP2019/017846
§ 371 (c)(1),
(2) Date: Oct. 30, 2020

(87) PCT Pub. No.: WO2019/212038
PCT Pub. Date: Nov. 7, 2019

(65) Prior Publication Data
US 2021/0366665 A1    Nov. 25, 2021

(30) Foreign Application Priority Data
May 2, 2018    (JP) .............................. JP2018-088676

(51) Int. Cl.
*H01G 11/50*    (2013.01)
*H01G 11/38*    (2013.01)
(Continued)

(52) U.S. Cl.
CPC ............. *H01G 11/38* (2013.01); *H01G 11/06* (2013.01); *H01G 11/50* (2013.01); *H01G 11/62* (2013.01)

(58) Field of Classification Search
CPC ........ H01G 11/62; H01G 11/06; H01G 11/28; H01G 11/38; H01G 11/50; H01G 11/60; Y02E 60/13
See application file for complete search history.

(56) References Cited

U.S. PATENT DOCUMENTS 9,011,709 B2 *  4/2015  Choi ...................... H01G 11/60
                                                            252/62.2
9,928,970 B2 *  3/2018  Matsuura ............... H01G 11/38
(Continued)

FOREIGN PATENT DOCUMENTS

EP    3 086 337 A1    10/2016
JP    2016-72309 A     5/2016
(Continued)

OTHER PUBLICATIONS

English translation of International Preliminary Report on Patentability dated Nov. 12, 2020 in PCT/JP2019/017846, 5 pages.
(Continued)

*Primary Examiner* — Dion R. Ferguson
(74) *Attorney, Agent, or Firm* — Oblon, McClelland, Maier & Neustadt, L.L.P.

(57) ABSTRACT

An alkali metal ion capacitor that is capable of operating in a high-temperature environment at 85° C. The alkali metal ion capacitor is provided with: a positive electrode active material capable of adsorbing and desorbing alkali metal ions; a positive electrode binder for binding the positive electrode active material; a negative electrode active material capable of storing and releasing alkali metal ions; a negative electrode binder for binding the negative electrode active material; and an electrolytic solution that contains an organic solvent and an imide-based alkali metal salt. The negative electrode active material is predoped with alkali metal ions. The positive electrode binder has a Hansen
(Continued)

solubility parameter-based RED value of more than 1 with respect to the electrolytic solution.

6 Claims, 6 Drawing Sheets

(51) Int. Cl.
  *H01G 11/06* (2013.01)
  *H01G 11/62* (2013.01)

(56) References Cited

U.S. PATENT DOCUMENTS

| | | | | |
|---|---|---|---|---|
| 2009/0297954 | A1* | 12/2009 | Hasegawa | H01G 9/038 429/324 |
| 2012/0042490 | A1* | 2/2012 | Lee | H01G 11/86 29/25.03 |
| 2014/0038045 | A1* | 2/2014 | Lee | H01M 4/62 429/213 |
| 2016/0314909 | A1* | 10/2016 | Matsuura | H01G 11/28 |
| 2017/0338057 | A1* | 11/2017 | Moon | H01G 11/86 |
| 2019/0131626 | A1* | 5/2019 | Wang | H01M 4/0445 |
| 2019/0139714 | A1* | 5/2019 | Shin | H01G 11/04 |
| 2020/0099091 | A1* | 3/2020 | Tsuzuki | H01G 11/62 |
| 2021/0234190 | A1* | 7/2021 | Komatsubara | H01M 50/105 |

FOREIGN PATENT DOCUMENTS

| | | | | |
|---|---|---|---|---|
| JP | 2017-17299 | A | 1/2017 | |
| JP | 2017-63069 | A | 3/2017 | |
| JP | 2017-139324 | A | 8/2017 | |
| KR | 101138584 | B1 * | 4/2012 | H01G 9/058 |
| WO | WO-2017026253 | A1 * | 2/2017 | H01G 11/06 |
| WO | WO-2019163894 | A1 * | 8/2019 | H01G 11/06 |
| WO | WO-2019163895 | A1 * | 8/2019 | H01G 11/06 |

OTHER PUBLICATIONS

International Search Report dated Jul. 9, 2019 in PCT/JP2019/017846 filed Apr. 26, 2019, citing documents AA and AO-AQ therein, 1 page.

Extended European Search Report dated Dec. 9, 2021 in European Patent Application No. 19796426.5, citing document AO therein, 8 pages.

\* cited by examiner

ALKALI METAL ION CAPACITOR

CROSS-REFERENCE TO RELATED APPLICATIONS

The present application is a U.S. National Phase entry of, and claims priority to, PCT Application PCT/JP2019/017846, filed Apr. 26, 2019, which claims priority to Japanese Patent Application No. 2018-088676, filed May 2, 2018, both of which are incorporated herein by reference in their entireties for all purposes.

BACKGROUND

The present disclosure relates to alkali metal ion capacitors.

A lithium ion capacitor is known as one kind of alkali metal ion capacitor. A lithium ion capacitor exhibits excellent characteristics, such as excellent energy density. Lithium ion capacitors can be used for more various purposes if they become more excellent in heat resistance. Accordingly, various technologies have been proposed for improving the heat resistance of lithium ion capacitors. For example, Japanese Laid-Open Patent Publication No. 2016-72309 discloses a lithium ion capacitor having a heat resistance up to about 50° C.

However, the heat resistance of the lithium ion capacitor disclosed in Japanese Laid-Open Patent Publication No. 2016-72309 is at most up to 50° C. Thus, a lithium ion capacitor capable of withstanding a higher temperature has been required. For example, in order to use a lithium ion capacitor in an automobile, it is required to improve the heat resistance of the lithium ion capacitor to about 85° C.

BRIEF SUMMARY

In one aspect of the present disclosure, an alkali metal ion capacitor comprising a positive electrode active material capable of adsorbing and desorbing alkali metal ions, a positive electrode binder for binding the positive electrode active material, a negative electrode active material capable of storing and releasing alkali metal ions, a negative electrode binder for binding the negative electrode active material, and an electrolytic solution which includes an organic solvent and an imide-based alkali metal salt. The negative electrode active material is pre-doped with the alkali metal ions and the positive electrode binder has a Hansen solubility parameter-based RED value of more than 1 with respect to the electrolytic solution.

According to the above-described aspect, the alkali metal ion capacitor can have the heat resistance at 85° C. When it is mentioned that an alkali metal ion capacitor has heat resistance in the present disclosure, it is meant that the alkali metal ion capacitor has performance operable in a high temperature environment.

DETAILED DESCRIPTION

Figure 1:
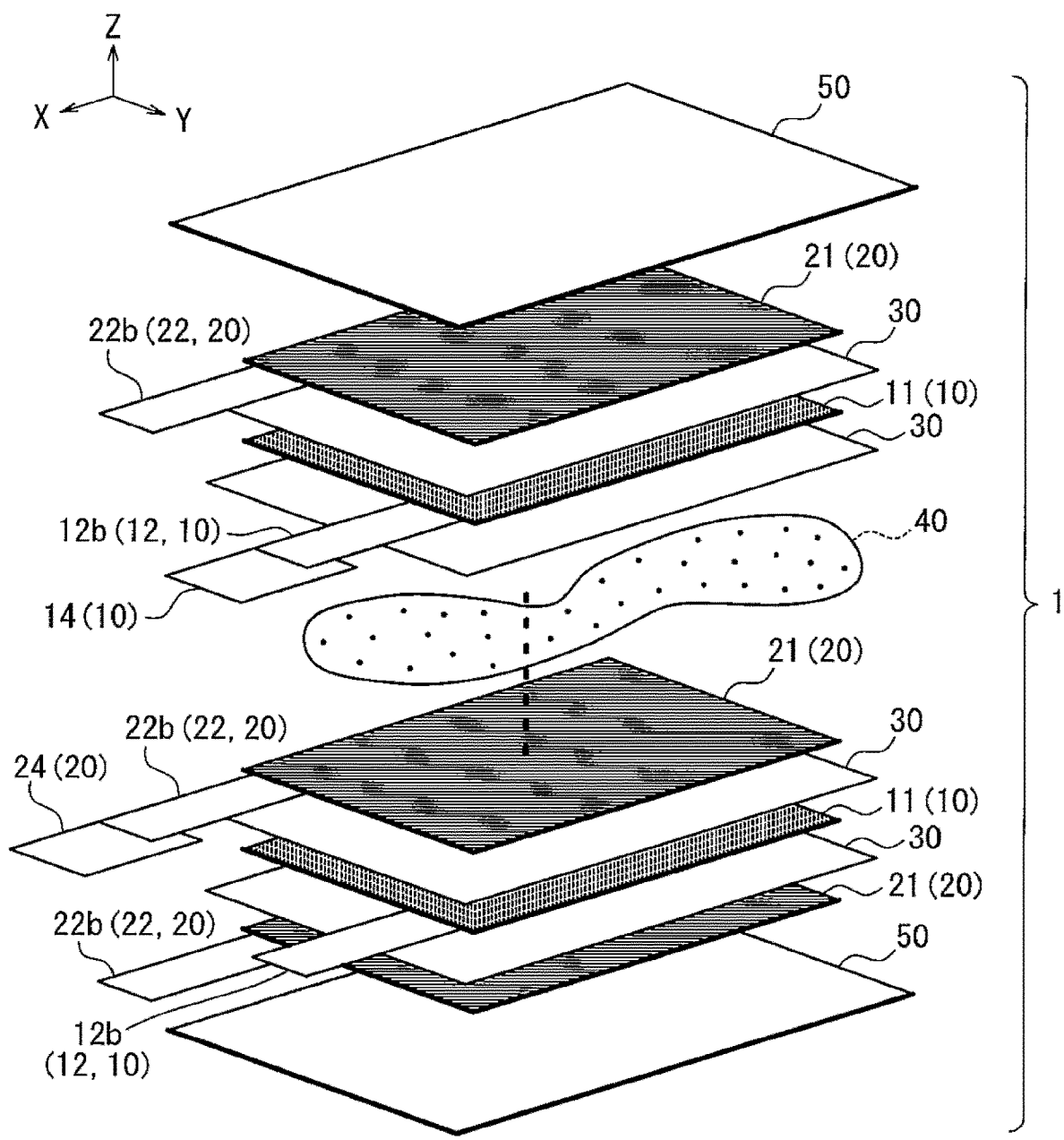
FIG. 1 is a schematic perspective view of an exploded lithium ion capacitor according to an embodiment.

A lithium ion capacitor 1 according to an embodiment of the present disclosure will be described, with reference to the Figures, as an example of an alkali metal ion capacitor. As shown in the exploded perspective view of FIG. 1, the lithium ion capacitor 1 includes a plurality of plate-like positive electrode plates 11 and a plurality of plate-like negative electrode plates 21, which are alternately arranged. Each positive electrode plate 11 is provided with an electrode terminal connection part 12b projecting in one direction. Each negative electrode plate 21 is also provided with an electrode terminal connection part 22b projecting in the same direction as the direction in which the electrode terminal connection part 12b of the positive electrode plate 11 protrudes. As shown in FIG. 1, the direction in which the electrode terminal connection part 12b of the positive electrode plate 11 projects is defined as an X-axis direction, and the direction in which the positive electrode plate 11 is laminated with the negative electrode plate is defined as a Z-axis direction, and the direction orthogonal to both X-axis and Z-axis is defined as a Y-axis direction. The X-axis, the Y-axis, and the Z-axis are orthogonal to each other. In all figures in which the X-axis, the Y-axis, and the Z-axis are illustrated, each of these axial directions indicates the same direction. The below description regarding the direction may be explained on the basis of these axial directions. Adjunctive elements mentioned in the following description are omitted from the drawings and will not described in detail.

[1. The Overall Structure of the Lithium Ion Capacitor 1 (FIGS. 1 to 3)]

As shown in FIG. 1, the lithium ion capacitor 1 includes a plurality of positive electrode plates 11, a plurality of negative electrode plates 21, a plurality of separators 30, an electrolytic solution 40, and laminate members 50. As shown in FIG. 1, the positive electrode plates 11 and the negative electrode plates 21 are alternately laminated such that the separator 30 is interposed between each adjacent positive electrode plate 11 and negative electrode plate 21. The electrolyte 40 is sealingly enclosed by a pair of the laminate members 50, being enclosed together with a part of each positive electrode plate 11, a part of each negative electrode plate 21, and the separators 30, which are laminated in this manner.

The electrode terminal connection parts 12b of the plurality of positive electrode plates 11 protrude in the same direction and are electrically connected to a positive electrode terminal 14. Conductive members constituting a positive electrode terminal side, such as the positive electrode terminal 14 and the plurality of positive electrode plates 11 connected thereto, can collectively be called a positive electrode 10. Similarly, the electrode terminal connection parts 22b of the plurality of negative electrode plates 21 are electrically connected to a negative electrode terminal 24. Conductive members constituting a negative electrode terminal side, such as the negative electrode terminal 24 and the plurality of negative electrode plates 21 connected thereto, can collectively be called a negative electrode 20.

Figure 2:
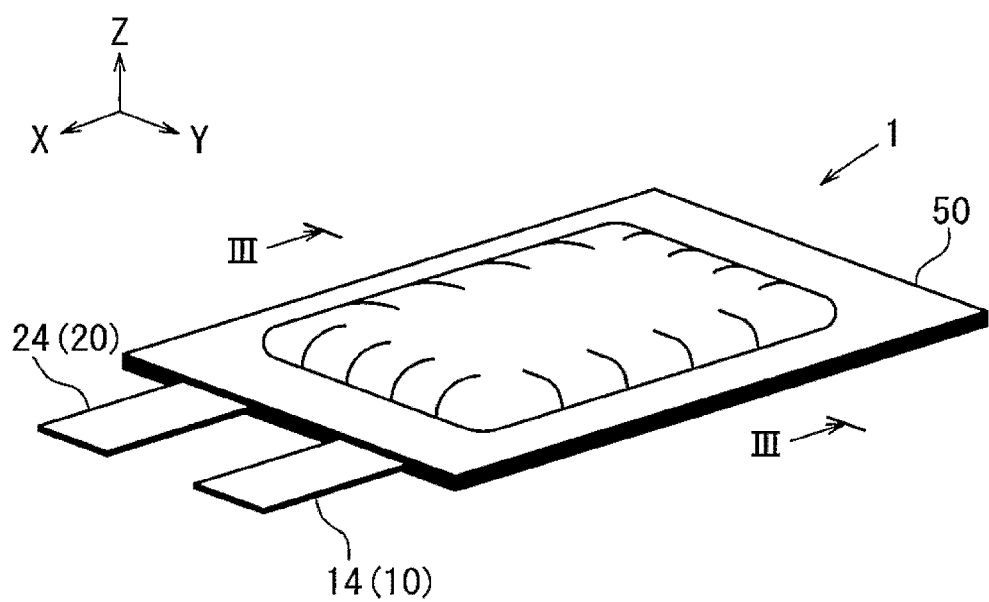
FIG. 2 is a perspective view of the lithium ion capacitor according to the embodiment.
Figure 3:
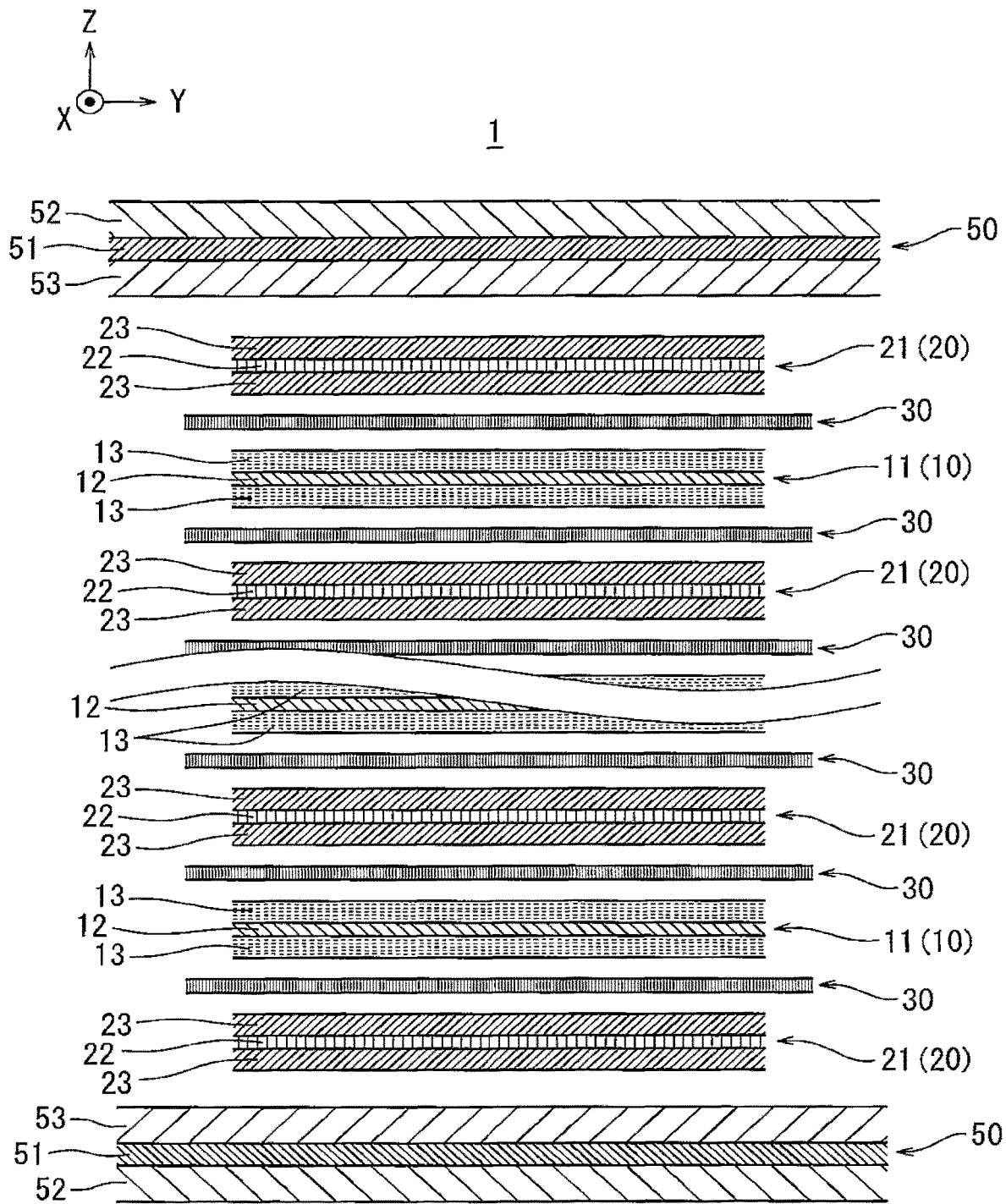
FIG. 3 is a schematic cross-sectional view of the lithium ion capacitor, taken along line of FIG. 2.

The lithium ion capacitor 1 generally has the above-described elements. FIG. 2 shows its general appearance. FIG. 3 schematically shows a cross-section of the lithium ion capacitor 1 shown in FIG. 2, taken along line III-III. In FIG. 3, an interval is provided between each member in the lithium ion capacitor 1 for clear understanding. However, in practice, the positive electrode plates 11, the negative electrode plates 21, and the separators 30 are laminated with almost no gap.

[2. Each Part of the Lithium Ion Capacitor 1 (FIGS. 1 and 3 to 7)]

[2-1. The Positive Electrode Plate 11 (FIGS. 1 and 3 to 5)]

Figure 4:
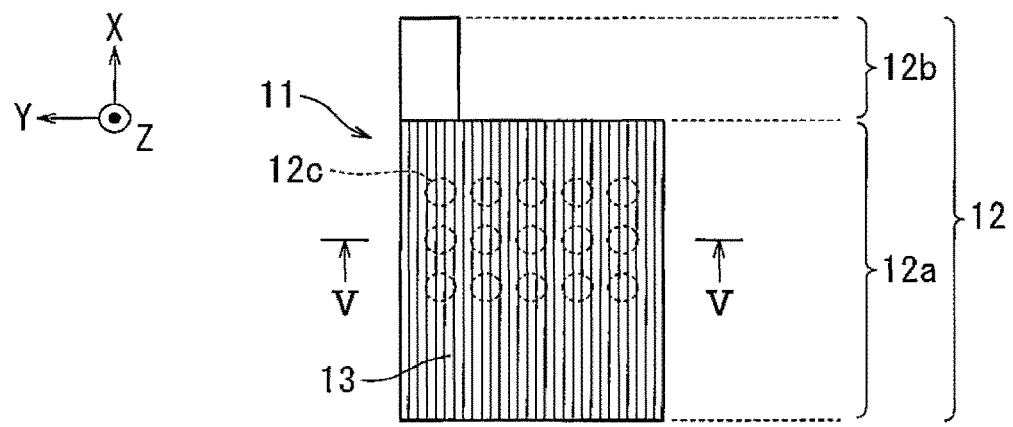
FIG. 4 is a diagram illustrating an example of the appearance of a positive electrode plate shown in FIG. 1.
Figure 5:
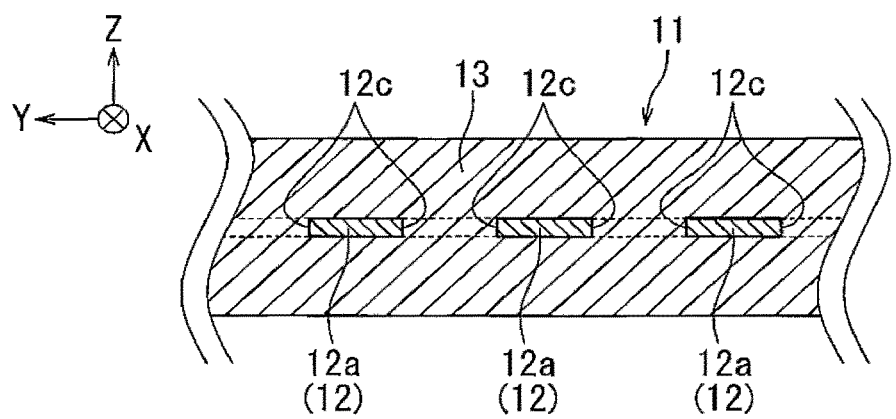
FIG. 5 is a cross-sectional view of the positive electrode plate, taken along line V-V of FIG. 4.

The positive electrode plate 11 is provided with a thin plate-like positive electrode current collector 12 and a positive electrode active material layer 13 coating the positive electrode current collector 12 (see FIGS. 3 to 5). The positive electrode active material layer 13 may be on both surfaces of the positive electrode current collector 12. However, it may instead be on one of either sides of the positive electrode current collector 12. During the manufacturing process, the positive electrode current collector 12 is coated with the positive electrode active material layer 13. It is then necessary to sufficiently dry the layered positive electrode active material 13 such that the lithium ion capacitor 1 does not contain excessive water.

The positive electrode current collector 12 is a metal foil, in which a plurality of holes 12c extending therethrough in the Z direction are formed (see FIGS. 4 and 5). The positive electrode current collector 12 includes a rectangular current collecting portion 12a (see FIG. 4) and an electrode terminal connection part 12b projecting outward from an edge (the left end of the upper side in the example of FIG. 4) of the current collecting portion 12a. The width in the Y-axis direction of the electrode terminal connection part 12b shown in FIGS. 1 and 4 can be changed appropriately, for example, to be the same width as that of the current collecting portion 12a. A plurality of holes 12c may be formed in the current collecting portion 12a (see FIGS. 4 and 5). However, a plurality of holes similar to the holes 12c of the current collecting portion 12a may or may not be formed in the electrode terminal connecting part 12b. Since the holes 12c are formed in the current collector 12a, cations and anions contained in the electrolytic solution 40 can pass through the current collector 12a. It is possible that the current collecting portion 12a does not have the holes 12c, and the electrode terminal connection part 12b does not have any holes similar to the holes 12c. A metal foil made of, for example, aluminum, stainless steel, copper, and/or nickel can be used as the positive electrode current collector 12.

The positive electrode active material layer 13 includes a positive electrode active material capable of adsorbing and desorbing lithium ions and includes a positive electrode binder. The positive electrode binder allows binding of the positive electrode active material and allows binding between the positive electrode active material and a current collecting portion 12a of a positive electrode current collector 12. In this way, the positive electrode active material layer 13 is configured to adsorb and desorb lithium ions by having a positive electrode active material. The positive electrode active material layer 13 may further include other components, such as a conductive assistant to enhance electric conductivity of the positive electrode active material layer 13 and/or a thickener to facilitate formation a positive electrode plate 11. The conductive assistant may be, for example, Ketjenblack, acetylene black, graphite fine particles, graphite fine fibers, etc. The thickener may be, for example, carboxymethyl cellulose [CMC], etc.

The positive electrode active material may be one or more materials which are used as a positive electrode active material in conventional lithium ion capacitors and which are capable of adsorbing and desorbing lithium ions. Such positive electrode active material(s) may be, for example, activated carbon, carbon nanotubes, polyacene, etc. These may be used singly or in a mixture of two or more kinds.

The positive electrode binder may be one or more binders which are used as a negative or positive electrode binder in conventional lithium ion capacitors and which have a relative energy difference RED value relative to the electrolytic solution 40 greater than one. The RED value is based on the Hansen Solubility Parameter (HSP), as described later. For example, the negative and positive electrode binders of a conventional lithium ion capacitor may be polyvinylidene fluoride [PVdF], polytetrafluoroethylene [PTFE], polyvinylpyrrolidone [PVP], polyvinyl chloride [PVC], polyethylene [PE], polypropylene [PP], ethylene-propylene copolymer, styrene butadiene rubber [SBR], acrylic resin, or polyacrylic acid.

The positive electrode binder has a RED value greater than one, which is based on HSP, with respect to the electrolytic solution 40. Thus, the positive electrode binder exhibits poor solubility in the electrolytic solution 40. The HSP was made public by Dr. Charles M. Hansen. This parameter is known as a solubility index and indicates how soluble a substance is in another substance. For example, water generally does not dissolve in oil due to a difference between the "characteristics" of water and oil. The HSP indicates the "characteristics" of a substance's solubility by using a dispersion term D, a polarity term P, and a hydrogen bonding term H for each substance, each as a numerical value. The dispersion term D shows a strength of van der Waals forces. The polar term P shows a size of the dipole moment. The hydrogen bonding term H shows the strength of hydrogen bonding. The basic idea of how this is applied is described below. Thus, the explanation of dividing the hydrogen bonding term H into a donor property and an acceptor property is omitted.

The Hansen solubility parameters (D, P, and H) are plotted in a three-dimensional orthogonal coordinate system (Hansen space, HSP space) to consider solubility. For example, a solution A and a solid B can be plotted in the Hansen space as a pair of points (point A, point B) according to the Hansen solubility parameters of the solution A and the solid B. The shorter the distance $R_a$ (the HSP distance, $R_a$) between points A and B, the more similar the "characteristics" of the solution A and the solid B. Accordingly, the solid B can be considered to be more readily soluble in the solution A. Conversely, the longer the distance $R_a$, the more dissimilar the "characteristics" of the solution A and the solid B. Thus, one can consider that it would be difficult to dissolve the solid B in the solution A.

The distance $R_a$ may have a boundary at which a substance is considered to transition between a soluble substance and an insoluble substance. This boundary is defined as an interaction radius $R_0$. Thus, regarding the solution A and the solid B, when the distance $R_a$ is shorter than the interaction radius $R_0$ ($R_a<R_0$), the solid B can be considered to be soluble in the solution A. On the other hand, when the distance $R_a$ is longer than the interaction radius $R_0$ ($R_0<R_a$), the solid B can be considered to be insoluble in the solution A. A RED value ($R_a/R_0$, Relative Energy Difference) is defined as the distance $R_a$ divided by the interaction radius $R_0$. When the RED value is less than one (RED=$R_a/R_0$<1), the distance $R_a$ is smaller than the interaction radius $R_0$. Thus, the solid B can be considered to be soluble in the solution A. On the other hand, when the RED value is greater than one (RED=$R_a/R_0$>1), the distance $R_a$ is greater than the interaction radius $R_0$. Thus, the solid B can be considered to be insoluble in the solution A. In this way, it is possible to judge whether the solid B can be dissolved in the solution A based on the RED value of the solution A and the solid B.

In this disclosure, the electrolytic solution 40 corresponds to the solution A, and the positive electrode binder corresponds to the solid B. The positive electrode binder has a RED value of greater than 1, with regard to the Hansen solubility parameter, with regards the electrolytic solution 40. Thus, the positive electrode binder exhibits poor solubility in the electrolytic solution 40. Said another way, if the positive electrode binder exhibits poor solubility in the electrolytic solution 40, the positive electrode binder can be considered to have the RED value greater than 1.

The Hansen solubility parameter and the interaction radius $R_0$ can be calculated by using the chemical structures and composition ratio of components and/or experimental results. In that case, the software HSPiP (Hansen Solubility Parameters in Practice: Windows® software for efficiently handling HSP) can be used to calculate the parameters. HSPiP is available at http://www.hansen-solubility.com/ at present (May 2, 2018). Even for a mixture of multiple solvents, the Hansen solubility parameters (D, P, and H) can be calculated.

<2-2. Negative Electrode Plate 21 (FIGS. 1, 3, 6, and 7)>

A negative electrode plate 21 according to this embodiment may have a composition generally similar to that of the above-described positive electrode plate 11. That is, the negative electrode plate 21 may have a thin plate-shaped negative electrode collector 22 and a negative electrode active material layer 23 coating the negative electrode collector 22. The negative electrode active material layer 23 may be coated on one of either surface or on both surfaces of the negative electrode collector 22. The negative electrode active material layer 23 coated on the negative electrode collector 22 needs to be sufficiently dried after coating so that the lithium ion capacitors do not contain excessive moisture. As described later, the negative electrode active material layer 23 is pre-doped with lithium ions Li+ at the time of manufacturing.

Figure 6:
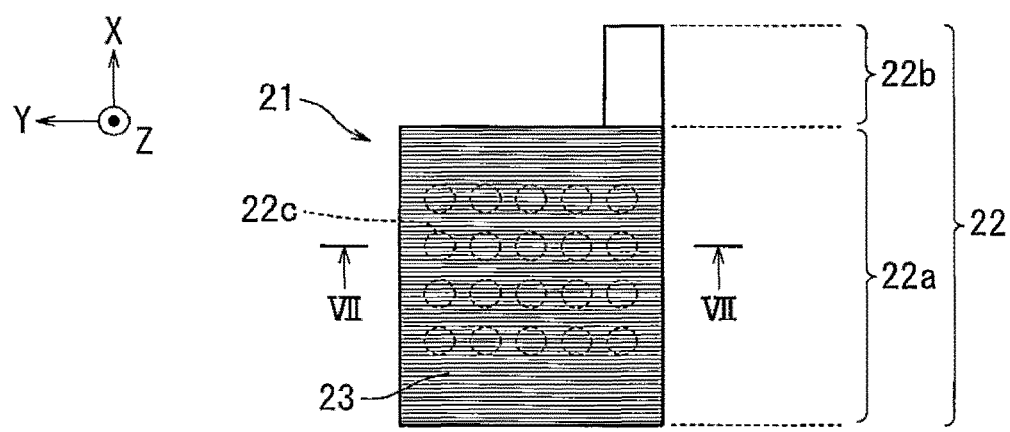
FIG. 6 is a view illustrating an example of the appearance of a negative electrode plate shown in FIG. 1.
Figure 7:
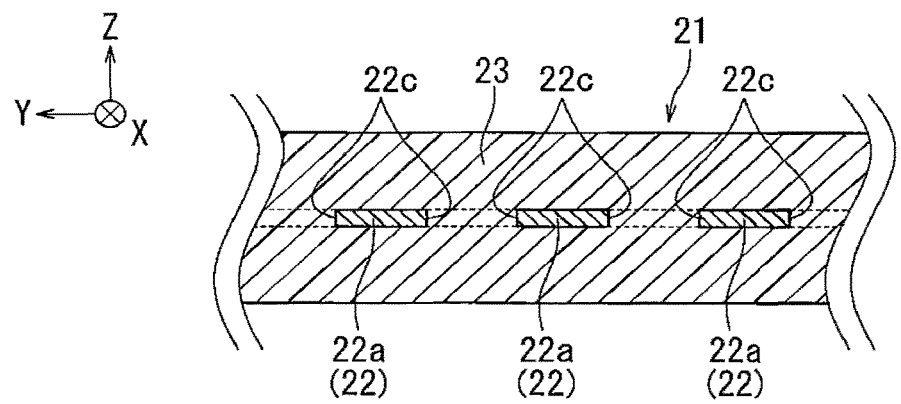
FIG. 7 is a cross-sectional view of the negative electrode plate, taken along line VII-VII of FIG. 6.

The negative electrode collector 22 is a metallic foil having holes 22c extending therethrough in Z direction, similar to the above-described holes 12c of the positive electrode current collector 12 of the positive electrode plate 11 (see FIGS. 6 and 7). A rectangular-shaped current collecting portion 22a and an electrode terminal connecting portion 22b projecting outwardly from one end of the current collecting portion 22a (right end of an upper side in FIG. 6) are integrally formed. Although the current collecting portion 22a has the holes 22c, the electrode terminal connecting portion 22b may or may not have holes like the holes 22c of the current collecting portion 22a. Since the current collecting portion 22a has the holes 22c, positive ions and negative ions included in the electrolytic solution 40 can be transmitted through the current collecting portion 12a of the positive electrode current collector 12. It is possible that the current collecting portion 22a of the negative electrode collector 22 does not have holes 22c, and the electrode terminal connecting portion 22b of the negative electrode collector 22 does not have any holes like the holes 22c of the current collecting portion 22a.

As illustrated in FIG. 1, the electrode terminal connecting portion 12b of the positive electrode plate 11 and the electrode terminal connecting portion 22b of the negative electrode plate 21 are disposed apart from each other in a surface direction of the negative electrode plate 21 so that they do not directly overlap each other. The width in the Y axis direction of the electrode terminal connecting portion 22b, which is shown in FIGS. 1 and 6, may be properly changed, for example, to be the same width as the current collecting portion 22a. The negative electrode collector 22 may be formed of a metallic foil comprised of for example, aluminum, stainless steel, and/or copper, similar to the positive electrode current collector 12 of the positive electrode plate 11.

Similar to the positive electrode active material layer 13, the negative electrode active material layer 23 includes a negative electrode active material capable of storing and releasing lithium ions and includes a negative electrode binder capable of binding the negative electrode active materials and binding to the current collecting portion 22a of the negative electrode collector 22. Further, the negative electrode active material layer 23 is configured to store and release lithium ions due to the negative electrode active materials contained therein. Further, the negative electrode active material layer 23 may include a conductive assistant to increase the electrical conductivity of the negative electrode active material layer 23, thickening materials to allow for easy manufacturing of the negative electrode plates 21, and/or other such materials. The conductive assistant may be made of the same materials as that used for the positive electrode plates 11 described above. That is, examples of the conductive assistant include Ketjenblack, acetylene black, small particulate of graphite, fine fiber of graphite, etc. An example of the thickening materials is carboxyl methyl cellulose [CMC], etc.

The negative electrode active material may be one or more materials which are used as a negative electrode active material in conventional lithium ion capacitors and conventional lithium ion secondary batteries and which are capable of storing and releasing lithium ions. Examples of the negative electrode active materials are carbon materials such as black lead (graphite), metal oxides such as tin oxides and silicon oxides, materials that are reformed by adding phosphorus and boron in order to increase negative electrode property, or other such materials. Further, another example of the negative electrode active material is lithium titanate with a spinel-type structure, shown by a formula $Li_{4-x}Ti_5O_{12}$ ($0 \leq x \leq 3$). Further, some of Ti atoms may be replaced with Al atoms and/or Mg atoms. Further, still other examples of the negative electrode active material are silicon materials such as silicon, silicon alloys, Sip, and silicon composite materials. Such materials may be used alone or as a mixture of two or more.

Similar to the positive electrode binder, the negative electrode binder may be one or more binders which are used as a positive or negative electrode binder in conventional lithium ion capacitors and which has a RED value, based on Hansen solubility parameter with respect to the electrolytic solution 40, greater than 1. Examples of the binders used in the conventional lithium ion capacitors include polyvinylidene fluoride [PVdF], polytetrafluoroethylene [PTFE], polyvinylpyrrolidone [PVP], polyvinylchloride [PVC], polyethylene [PE], polypropylene [PP], ethylene-propylene copolymers, styrene-butadiene rubber [SBR], acrylic resins, and polyacrylic acid. These binders used in conventional lithium ion capacitors may be used in the negative electrode binder of the lithium ion capacitor 1, provided that the RED value based on Hansen solubility parameter with regard to the electrolytic solution 40 is greater than 1.

Lithium ions $Li^+$ are introduced into the negative electrode active material layer 23 (pre-doped) at the time of manufacture. Further, the amount of lithium ion $Li^+$ to be pre-doped may be bound by an upper limit, which will be hereinafter described in detail.

Pre-doping may basically be performed by one of at least the following two methods. In one method, as shown in FIG. 1, a plurality of positive electrode plates 11, a plurality of negative electrode plates 21, and a plurality of separators 30 are layered. The layered structure is then placed in an interior (FIG. 2) of a laminate member 50 and an electrolytic solution 40 is added before pre-doping is performed. That is, the pre-doping may be performed within the interior of the laminate member 50. In the other method of the two, lithium ions $Li^+$ are introduced into the negative electrode active materials before the negative electrode plates 21 are formed. That is, the pre-doping may be performed exterior of the laminate member 50.

The method in which the pre-doping is performed within the interior of the laminate member 50 include two methods, a chemical and an electrochemical method. In the method in which the pre-doping is performed within the interior of the laminate member 50, the plurality of positive electrode plates 11, the plurality of negative electrode plates 21, the plurality of separators 30, and the electrolytic solution 40 are placed in the interior (FIG. 2) of the laminate member 50 before the pre-doping is performed. In the chemical method, metal lithium is dissolved in the electrolytic solution 40 to produce lithium ion $Li^+$, so as to allow the lithium ions $Li^+$ to be stored in the negative electrode active materials. Conversely, in the electrochemical method, metal lithium and the negative electrode plates 21 have a voltage applied to them to produce lithium ion $Li^+$ from metal lithium, so as to allow the lithium ions $Li^+$ to be stored in the negative electrode active materials.

In each of the chemical method and the electrochemical method, it is preferable that lithium ions Li' can pass through the collecting portions 12a (see FIG. 5) of the positive electrode collectors 12 of the positive electrode plates 11 and the collecting portions 22a (see FIG. 7) of the negative electrode collectors 22 of the negative electrode plates 21, such that lithium ions $Li^+$ can easily diffuse within the electrolytic solution 40. Therefore, for the pre-doping to be performed by the chemical method and the electrochemical method, a plurality of holes 12c may preferably be formed in the collecting portions 12a of the positive electrode collectors 12. Further, a plurality of holes 22c may preferably be formed in the collecting portions 22a (see FIG. 7) of the negative electrode collectors 22.

In the method in which the pre-doping is performed exterior of the laminate member 50, lithium ions $Li^+$ are introduced into the negative electrode active materials before the negative electrode plates 21 are formed. Therefore, lithium ions $Li^+$ need not be diffused within the electrolytic solution 40 in order to perform the pre-doping. Therefore, when the pre-doping is performed exterior of the laminate member 50, it is not necessary to form the plurality of holes 12c in the collecting portions 12a of the positive electrode collectors 12. Similarly, it is not necessary to form the plurality of holes 22c in the collecting portions 22a (see FIG. 7) of the negative electrode collectors 22.

Further, the method in which the pre-doping is performed interior of the laminate member 50 may be used in combination with the method in which the pre-doping may be performed exterior of the laminate member 50, as necessary. After pre-doping has been performed exterior of the laminate member 50, the plurality of positive electrode plates 11, the plurality of negative electrode plates 21, and the plurality of separators 30 may be placed within the interior (see FIG. 2) of the laminate member 50 with the electrolytic solution 40. Subsequently, an additional pre-doping may be performed interior of the laminate member 50 using the chemical method or the electrochemical method.

<2-3. Separators 30 (FIG. 1)>

As shown in FIG. 1, the separators 30 may be configured to separate the positive electrode plates 11 and the negative electrode plates 21. The separators 30 may be made of a porous material that allow cations and anions contained within the electrolytic solution 40 to pass therethrough. Each of the separators 30 may be formed into a rectangular sheet shape. The vertical and lateral sizes of each of the separators 30 is configured to be greater than the length of each the collecting portions 12a of the positive electrode collectors 12 of the positive electrode plates 11 and greater than the length of the collecting portions 22a of the negative electrode collectors 22 of the negative electrode plates 21. The separators 30 may be separators that are used in conventional lithium ion capacitors. Examples of the separators 30 include paper made of viscose rayon and native cellulose and non-woven fabric made of polyethylene, polypropylene, etc.

<2-4. Electrolytic Solution 40>

The electrolytic solution 40 may contain an organic solvent (non-aqueous solvents) and an imide-based lithium salt as the electrolyte. The electrolytic solution 40 may additionally contain additives, as necessary. Examples of the additives include vinylene carbonate [VC], fluoroethylene carbonate [FEC], ethylene sulfide (ES), or other such compositions that may accelerate production of an SEI film (Solid Electrolyte Interface film) on the negative electrode.

The organic solvents may be organic solvents having heat resistance at least up to 85° C. Examples of the organic solvents include carbonate-based organic solvents, nitrile-based organic solvents, lactone-based organic solvents, ether-based organic solvents, alcohol-based organic solvents, ester-based organic solvents, amid-based organic solvents, sulfone-based organic solvents, ketone-based organic solvents, and aromatic organic solvents. These organic solvents may be used alone or as a mixture of solvents in which two or more solvents are mixed at a ratio. Further, examples of carbonate-based organic solvents include cyclic carbonate such as ethylene carbonate [EC], propylene carbonate [PC], and chain carbonate such as fluoroethylene carbonate [FEC], ethyl methyl carbonate [EMC], diethyl carbonate [DEC], and dimethyl carbonate [DMC]. However, the organic solvent preferably does not contain dimethyl carbonate [DMC], which is a one chain carbonate. The dimethyl carbonate [DMC] may, rarely, cause a deterioration in heat resistance.

Examples of the nitrile-based organic solvent include acetonitrile, acrylonitrile, adiponitrile, valeronitrile, and isobutyronitrile. Further, examples of the lactone-based organic solvent include gamma-butyrolactone and gamma-valerolactone. Examples of the ether-based organic solvent include cyclic ethers, such as tetrahydrofuran and dioxane, chain ether, such as 1,2-dimethoxyethane, dimethyl ether, and triglyme. Examples of the alcohol-based organic solvent include ethyl alcohol and ethylene glycol. Examples of the ester-based organic solvent include methyl acetate, propyl acetate, phosphoric acid esters, such as trimethyl phosphate, sulfuric acid esters, such as dimethyl sulfate, and sulfite esters, such as dimethylsulfites. Examples of the amide-based organic solvent include N-methyl-2-pyrrolidone and ethylenediamine. Examples of the sulfone-based organic solvent include chain sulfones, such as dimethyl sulfone, and cyclic sulfones, such as 3-sulfylene. Example of the ketone-based organic solvent and aromatic organic solvent respectively include methyl ethyl ketone and toluene. The various organic solvents, except for the carbonate-based organic solvent, may preferably be used with a cyclic carbonate, in particular, with ethylene carbonate [EC], capable of producing an SEI film (Solid Electrode Interface Film) on the negative electrode. In this case, the positive electrode binder and the negative electrode binder are preferably polyacrylic acid. The organic solvent may preferably contain ethyl methyl carbonate [EMC] and diethyl carbonate [DEC].

The electrolyte may be an imide-based lithium salt (a lithium salt having [—$SO_2$—N—$SO_2$—] as a partial structure). Here, examples of the imide-based lithium salt include lithium bis(fluorosulfonyl)imide [$LiN(FSO_2)_2$, LiFSI], lithium bis(trifluoromethanesulfonyl)imide [$LiN(SO_2CF_3)_2$, LiTFSI], and lithium bis(pentafluoroethanesulfonyl)imide [$LiN(SO_2CF_2CF_3)_2$, LiBETI]. These imide-based lithium salts may be used alone or as a mixture of two or more. These imide-based lithium salts have heat resistance at 85° C. Among these salts, an imide-based lithium salt (for example, lithium bis(fluorosulfonyl)imide [$LiN(FSO_2)_2$, LiFSI]) that does not have a trifluoromethane group (—$CF_3$), a pentafluoroethane group (—$CF_2CF_3$), or a pentafluorophenyl group (—$C_6F_5$) may preferably be used because the positive electrode binder and the negative electrode binder may tend to have a RED value based on Hansen solubility parameter greater than 1 with respect to such an imide-based lithium salt. In addition, the ionic conductivity of the electrolyte 40 is less likely to decrease at high or low temperature. As a result, the electrolyte 40 may be stabilized.

The concentration of the electrolyte contained in the electrolytic solution 40 may preferably be 0.5-10.0 mol/L. In view of an appropriate degree of viscosity and the ionic conductivity of the electrolyte 40, the concentration of the electrolyte contained in the electrolytic solution 40 may preferably be 0.5-2.0 mol/L. Concentrations less than 0.5 mol/L are not appropriate because the ion conductivity of the electrolyte 40 is excessively reduced due to a decrease in the concentration of ions dissociated by the electrolyte. On the other hand, concentrations greater than 10.0 mol/L are also not appropriate because the ion conductivity of the electrolyte 40 is excessively reduced due to an increase in the viscosity of the electrolyte 40. Therefore, such an increased concentration of the electrolyte. Further, when the electrolytic solution 40 contains the organic solvent and the electrolyte described above, it is preferable that the positive electrode binder and the negative electrode binder are polyacrylic acid.

<2-5. Laminate Member 50 (FIGS. 1 and 3)>

As shown in FIG. 3, the laminate member 50 includes a core material sheet 51, an outer sheet 52, and an inner sheet 53. The outer sheet 52 is bonded to the outer surface of the core material sheet 51, and the inner sheet 53 is bonded to the inner surface of the core material sheet 51. For example, the core material sheet 51 may be an aluminum foil, the outer sheet 52 may be a plastic sheet, such as a nylon PET film, and the inner sheet 53 may be a plastic sheet, such as a polypropylene.

<3. Charging/Discharging Process of the Lithium Ion Capacitor 1 (FIGS. 8 and 9)>

Figure 8:
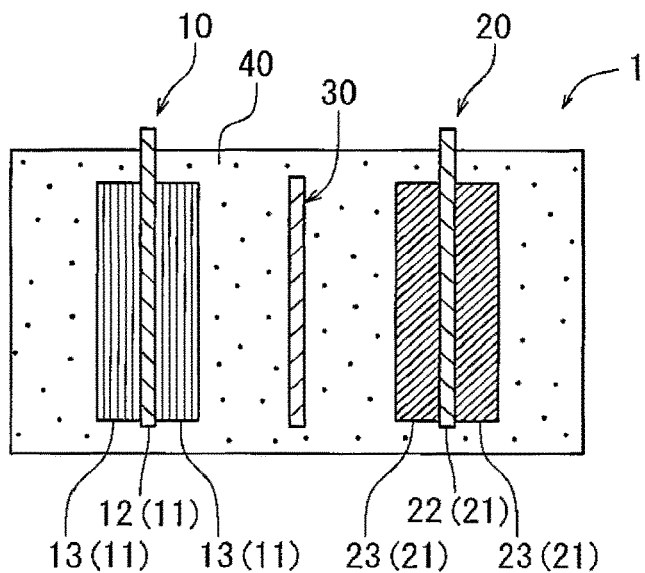
FIG. 8 is a diagram illustrating a positional relationship between the positive electrode plate of a positive electrode, the negative electrode plate of a negative electrode, a separator, and the electrolyte shown in FIG. 1.

FIG. 8 schematically shows the positional relationship among the positive electrode plate 11 of the positive electrode 10, the negative electrode plate 21 of the negative electrode 20, the separator 30, and the electrolytic solution 40 of the lithium ion capacitor. As shown in FIG. 8, the lithium ion capacitor 1 includes the positive electrode plate 11 and the negative electrode plate 21 that counter with each other with the separator 30 interposed therebetween. When the lithium ion capacitor 1 is charged and discharged, anions of the electrolyte are adsorbed on the surfaces of the positive electrode active material layer 13 of the positive electrode plate 11, forming an electric double layer, and desorbed from the positive electrode active material, while in the negative electrode plate 21 lithium ions $Li^+$ are stored into and released from the negative electrode active material layer 23. When the lithium ion capacitor 1 is manufactured, the above described pre-doping is performed to introduce lithium ions $Li^+$ in the negative electrode active material layer 23 of the negative electrode plate 21. Because of the lithium ions $Li^+$ introduced in the negative electrode active material, the lithium ion capacitor 1 may have a higher potential difference between the positive electrode plate 11 and the negative electrode plate 21. This can increase the energy density of the electric double layer formed on the positive electrode plate 11. As a result, the lithium ion capacitor 1 can achieve a higher output.

<4. Pre-Doping>

Although the lithium ions $Li^+$ are pre-doped in the negative electrode active material layer 23, an upper limit value of the amount of the lithium ions $Li^+$ to be pre-doped can be set as described below. The following description supposes that the electrolyte ionizes into lithium ions and anions X.

In the fully discharged state, no electric double layer is formed on the surface of the positive electrode active material layer 13, and only the pre-doped lithium ions $Li^+$ are stored in the negative electrode active material. When transitioning from the fully discharged state toward the fully charged state, anions $X^-$ of the electrolyte are gradually adsorbed in the positive electrode active material layer 13, forming an electric double layer, while lithium ions $Li^+$ are additionally stored into the negative electrode active material layer 23 in the same amount (moles) as the anions $X^-$ adsorbed in the positive electrode active material layer 13. The total amount of lithium ions $Li^+$ stored in the negative electrode active material layer 23 corresponds to the sum of the amount (moles) $N_p$ of the lithium ions $Li^+$ introduced by pre-doping and the amount (moles) of the anions $X^-$ adsorbed in the positive electrode active material layer 13.

Figure 9:
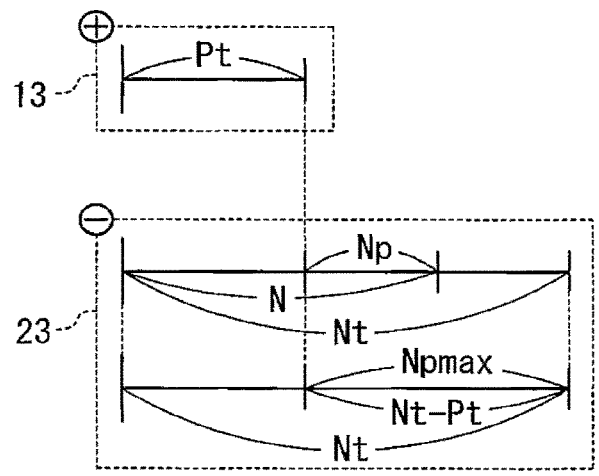
FIG. 9 is a diagram illustrating an upper limit of the pre-doping amount of the negative electrode.

FIG. 9 shows the amount (moles) of anions $X^-$ adsorbed in the positive electrode active material layer 13 and the amount (moles) of lithium ions $Li^+$ stored in the negative electrode active material layer 23 at full charge. At full charge, the amount (moles) of anions $X^-$ adsorbed in the positive electrode active material layer 13 becomes the maximum amount $P_t$, and the amount (moles) of lithium ions $Li^+$ stored in the negative electrode active material layer 23 becomes N (see FIG. 9). At full charge, the amount (moles) of lithium ions $Li^+$ stored in the negative electrode active material layer 23 is equal to the sum of the amount (moles) $N_p$ of the lithium ions $Li^+$ introduced by pre-doping and the amount $P_t$ of the anions $X^-$ adsorbed in the positive electrode active material layer 13 (i.e., $N=N_p+P_t$, see FIG. 9). In FIG.

9, $N_t$ represents the amount (moles) of lithium ions Li$^+$ that can be stored in the non-predoped negative electrode active material layer 23.

If the pre-dope amount $N_p$ of lithium ions Li$^+$ would cause the amount $N(=N_p+P_t$, see FIG. 9) of the lithium ions Li$^+$ stored in the negative electrode active material layer 23 at the time of full charge to exceed the amount $N_t$ of the lithium ions Li$^+$ that could be stored in the non-predoped negative electrode active material layer 23 (i.e., $N_p+P_t>N_t$), the excess amount (that is, $N_p+P_t-N_t$) cannot be stored into the negative electrode active material layer 23. Therefore, the excess amount may precipitate from the electrolytic solution as metallic lithium. Therefore, the upper limit $N_{pmax}$ of the amount Np of lithium ions Li$^+$ introduced into the negative electrode active material layer 23 by pre-doping is set so that $N_{pmax}=N_t-P_t$. As a result, $N_p+P_t \leq N_t$ is satisfied, and the lithium ions Li' can be accommodated by the negative electrode active material layer 23. This suppresses precipitation of the lithium ions Li$^+$.

The amount $N_t$ of lithium ions Li$^+$ that can be stored in the non-predoped negative electrode active material layer 23 and the amount $P_t$ of anions X$^-$ adsorbed in the positive electrode active material layer 13 at full charge may be calculated, for example, from the theoretical values of the positive electrode active material and negative electrode active material, or from experimentally obtained measurements of the amount of lithium ions Li$^+$ that can be stored in the non-predoped negative electrode active material and the amount of lithium ions Li$^+$ adsorbed in the positive electrode active material. Using these calculated values, it is possible to calculate the upper limit value $N_{pmax}(=N_t-P_t)$ of the amount $N_p$ of lithium ions Li$^+$ that should be introduced into the negative electrode active material layer 23 during pre-doping.

As described above, the upper limit value $N_{pmax}$ of the amount $N_p$ of lithium ions Li$^+$ that should be introduced into the negative electrode active material layer 23 by pre-doping is $N_{pmax}=N_t-P_t$. Therefore, $N_{pmax}$ varies depending on the value of N, and the value of $P_t$ (see FIG. 9). Roughly speaking, $N_{pmax}$ increases as the value of N, increases, and $N_{pmax}$ decreases as the value of $P_t$ increases (see FIG. 9). For example, when $N_t$ is two times as large as $P_t$ (i.e., $N_t=2 \cdot P_t$), $N_{pmax}$ is equal to $P_t$ (see FIG. 9). For example, when $N_t$ is 3 times as large as $P_t$ (i.e., $N_t=N_{pmax}$ is equal to 2 times as large as $P_t$ (i.e., $2 \cdot P_t$) (see FIG. 9). Thus, $N_{pmax}$ varies depending on the value of $N_p$ and the value of $P_t$ (see FIG. 9). That is, the upper limit value $N_{pmax}$ of the amount $N_p$ of lithium ions Li$^+$ that are to be introduced into the negative electrode active material layer 23 by pre-doping varies depending on the amount $N_t$ of lithium ions Li$^+$ that could be stored in the non-predoped negative electrode active material layer 23 and the amount $P_t$ of the anions adsorbed in the positive electrode active material layer 13 at full charge.

Further, as described above, setting the upper limit $N_{pmax}$ of the amount $N_p$ of lithium ions Li$^+$ to be introduced into the negative electrode active material layer 23 by pre-doping to $N_{pmax}=N_t-P_t$ can be rephrased as follows. The amount of lithium ions Li$^+$ stored in the negative electrode active material layer 23 reaches the maximum at full charge during the charging/discharging process. As described above, the amount N of lithium ions Li$^+$ stored in the negative electrode active material layer 23 at full charge is equal to the amount $N_p$ of lithium ions Li$^+$ introduced into the negative electrode active material layer 23 by pre-doping plus the amount $P_t$ of the anions adsorbed in the positive electrode active material layer 13 at full charge, $N_p+P_t$ (i.e., $N=N_p+P_t$) (see FIG. 9). When the amount $N_p$ of lithium ions Li$^+$ introduced into the negative electrode active material layer 23 by pre-doping is at the upper limit $N_{pmax}$ ($N_p=N_{pmax}=N_t-P_t$), the amount N of lithium ions Li$^+$ stored in the negative electrode active material layer 23 at full charge ($=N_p+P_t$) is $N=N_p+P_t=N_t-P_t+P_t=N_t$.

The amount N of the lithium ions Li$^+$ stored in the negative electrode active material layer 23 at full charge (see FIG. 9) is represented as a percentage (%) of the amount $N_t$ of the lithium ions Li$^+$ that could be stored in the non-predoped negative electrode active material layer 23. N is 100% when $N=N_t$. As described above, when the amount $N_p$ of lithium ions Li$^+$ introduced into the negative electrode active material layer 23 during the pre-doping process reaches its upper limit $N_{pmax}$ ($N_p=N_{pmax}=N_t-P_t$), the amount N of the lithium ions Li$^+$ stored in the negative electrode active material layer 23 at full charge becomes $N=N_t$, and therefore, N=100%. Further, as described above, the maximum amount of lithium ions Li$^+$ stored in the negative electrode active material layer 23 is $N(=N_p+P_t)$ at full charge. Therefore, when the amount $N_p$ of the lithium ions Li$^-$ introduced into the negative electrode active material layer 23 by pre-doping is the upper limit $N_{pmax}$ ($N_p=N_{pmax}=N_t-P_t$), the amount of lithium ions Lit stored in the negative electrode active material layer 23 at full charge is N=100% at the maximum, and does not exceed 100%. That is, the amount of the lithium ions Li$^+$ to be introduced into the negative electrode active material layer 23 during the pre-doping process is always adjusted to be 100% or less of the amount $N_t$ of lithium ions Li$^+$ that could be stored in the non-predoped negative electrode active material layer 23 in the course of charging and discharging. This is done by setting an upper limit $N_{pmax}$ ($=N_t-P_t$) for the amount $N_p$ of the lithium ions Li$^-$ to be introduced into the negative electrode active material layer 23 during pre-doping. The doping rate of the negative electrode active material in the negative electrode active material layer may be represented as follows:

$$\text{Doping ratio (\%)}=N/N_t \times 100$$

N: Amount (moles) of lithium ions stored in the negative electrode active material (negative electrode active material layer) at full charge $N_t$: Amount (moles) of lithium ions that could be stored in the non-predoped negative electrode active material (negative electrode active material layer).

<Heat Resistance of a Lithium Ion Capacitor>

The lithium ion capacitor 1 configured as described above may have heat resistance at 85° C.

When a conventional lithium ion capacitor is maintained at about 85° C., the lithium ions Li$^+$ may gradually change to an inactive compound. As a result, the amount of lithium ions Li$^+$ which can participate in charge/discharge may decrease, thereby causing the charge/discharge capacity to decrease. Such lithium ion capacitors may have a reduced charge/discharge capacity at a high temperature, that is, they may have poor high temperature durability. In the present disclosure, a high temperature durability means that the charge/discharge capacity of the lithium ion capacitor is maintained at a sufficient amount, even if the lithium ion capacitor remains at a high temperature for a long time.

On the other hand, in the lithium ion capacitor 1 of the present embodiment, the negative electrode active material is pre-doped with lithium ions Li$^+$, that is, the lithium ions Li$^+$ are stored in advance in the negative electrode active material. Therefore, even if some of the lithium ions Li$^+$ required for charging and discharging change to an inactive compound, the lithium ions Li$^+$ introduced in the negative electrode active material during the pre-doping process may compensate for the change. As a result, a decrease in charge/discharge capacity of the lithium ion capacitor 1 may be suppressed. Therefore, the lithium ion capacitor 1 not only has heat resistance at 85° C., but also has high temperature durability.

When the lithium ion capacitor is used for a long time in a high temperature environment, the discharge capacity may decrease and the internal resistance may increase. However, as the dope rate increases, the rate of decrease in discharge capacity and the rate of increase in internal resistance tend to be lower. Therefore, the dope ratio is preferably 50% to 100%, more preferably 80% to 100%, and even more preferably 90% to 100%.

Other Embodiments

The alkali metal ion capacitor of the present disclosure is not limited to the structure, configuration, appearance, shape, and/or the like described in the above-described embodiment. Various modifications, additions, and/or deletions may be made by understanding the above-described embodiment.

For example, the above-mentioned lithium ion capacitor 1 may be a laminated lithium ion capacitor in which a positive electrode plate 11, a negative electrode plate 21, and a separator 30 may be laminated. However, the lithium ion capacitor 1 may be a wound type lithium ion capacitor, in which a long positive electrode, a long negative electrode, and a long separator may be wound.

Further, the art of the present disclosure is not limited to a lithium ion capacitor, and may be applied to various alkali metal ion capacitors. Each alkali metal ion capacitor may include a positive electrode active material, a positive electrode binder, a negative electrode active material, a negative electrode binder, and an electrolytic solution. The positive electrode active material may adsorb and desorb alkali metal ions. The positive electrode binder may bind the positive electrode active material. The negative electrode active material may store and release alkali metal ions. The negative electrode binder may bind the negative electrode active material. The electrolytic solution may include an organic solvent and an imide-based alkali metal salt. Examples of alkali metals other than lithium may include sodium, potassium, and the like. The standard electrode potential of these alkali metals is −3.045V for lithium, −2.714V for sodium, and −2.925V for potassium. The alkali metal ion capacitor may be configured so that the standard electrode potential difference between the positive electrode and the negative electrode is relatively large, and these alkali metal ions may participate in charging and discharging. In the case of an alkali metal ion capacitor other than lithium, the doping rate of the negative electrode active material is expressed by the following formula.

$$\text{Doping ratio (\%)} = Z/Z_f \times 100$$

$Z$: Amount (moles) of alkali metal ions stored in the negative electrode active material (negative electrode active material layer) when fully charged.
$Z_f$: Amount (moles) of alkali metal ions which could be stored in the non-predoped negative electrode active material (negative electrode active material layer).

Hereinafter, the arts of the present disclosure will be described in more detail with reference to examples. However, the arts of the present disclosure are not limited to these examples.

[Preparation of Positive Electrodes]

Slurries A to C, which include the positive electrode active materials, for the positive electrodes were prepared with the compositions shown in Table 1. Powdered activated carbon was used as the positive electrode active material. Polyacrylic acid (sodium neutralized salt of polyacrylic acid), acrylic acid ester, or styrene-butadiene rubber [SBR] was used as the binder. Acetylene black was used as the conductive assistant. Carboxymethyl cellulose [CMC] was used as the thickening material. Water was used as the solvent. In Table 1, "part" indicates a mass part, and "%" indicates a mass %.

TABLE 1

| Slurry for Positive electrode | Binder type | Positive electrode active materials | Conductive assistant | Binder | Thickening material | Solvent |
|---|---|---|---|---|---|---|
| A | Polyacrylic acid | 88 parts | 15 parts (17%) | 6 parts (7%) | — | 345 parts |
| B | Acrylic acid ester | 88 parts | 15 parts (17%) | 3 parts (3%) | 1 part | 220 parts |
| C | SBR | 88 parts | 16 parts (17%) | 1 part (1%) | 1 part | 220 parts |

Slurry A, using polyacrylic acid as the binder, was prepared by the following procedure for a positive electrode.
(1) All the materials and water were mixed with Mixer A (Awatori Rentaro ARE-310, produced by Thinky Corporation) to prepare a pre-slurry.
(2) The pre-slurry obtained in (1) was further mixed with Mixer B (Filmix 40-L, produced by Primix Corporation) to prepare an intermediate slurry.
(3) The intermediate slurry obtained in (2) was mixed again with Mixer A to prepare slurry A for a positive electrode.

Slurries B and C, respectively using acrylic acid ester or SBR as the binder, were prepared by the following procedure for the positive electrode.
(1) The materials, excluding the binder, and water were mixed with Mixer A to prepare a pre-slurry.
(2) The pre-slurry obtained in (1) was further mixed with Mixer B to prepare an intermediate slurry.
(3) The binder was added to the intermediate slurry obtained in (2), and mixed with Mixer A to prepare slurry B or C for a positive electrode.

Next, using an aluminum foil (porous foil) having a thickness of 15 μm as the current collector foil, the positive electrode slurries A to C were each coated on the current collector foil. They were then dried to prepare positive electrodes A to C. The amount of positive electrode slurry coated on each current collector foil was adjusted so that the mass of the activated carbon after drying was 3 mg/cm². A blade coater or a die coater was used to coat the positive electrode slurry on the current collector foil.

[Preparation of Negative Electrodes]

95 parts by mass of graphite as the negative electrode active material, 1 part by mass of SBR as the binder, 1 part by mass of CMC as a thickening material, and 100 parts by mass of water as the solvent were mixed to prepare a slurry for a negative electrode according to the following procedure.

(1) The materials, excluding the binder, and water were mixed with Mixer A to prepare a pre-slurry.

(2) The pre-slurry obtained in (1) was further mixed with Mixer B to prepare an intermediate slurry.

(3) The binder was added to the intermediate slurry obtained in (2), and mixed with Mixer A to prepare a slurry for a negative electrode.

Next, using a copper foil (porous foil) having a thickness of 10 μm as the current collector foil, the negative electrode slurry was coated on the current collector foil. They were then dried to prepare the negative electrodes. The amount of negative electrode slurry coated was adjusted so that the mass of graphite after drying was 3 mg/cm$^2$. A blade coater was used to coat the negative electrode slurry on the current collector foil.

[Preparation of Electrolytic Solution]

A mixed solvent of 30 vol % of ethylene carbonate (EC), 30 vol % of dimethyl carbonate (DMC), and 40 vol % of ethyl methyl carbonate (EMC) was used as a solvent. Then, 1 mol/L of Lithium bis(fluorosulfonyl)imide (LiFSI) was added to the mixed solvent to prepare the electrolytic solution I. Lithium hexafluorophosphate (LiPF$_6$) was added to the mixed solvent to prepare the electrolytic solution P. A mixed solvent of 30 vol % of ethylene carbonate (EC), 46.7 vol % of ethyl methyl carbonate (EMC), 23.3 vol % of diethyl carbonate (DEC), and 10 vol % of propylene carbonate (PC) was used as a solvent. 1 mol/L of lithium bis(fluorosulfonyl)imide (LiFSI) was added to the mixed solvent to prepare the electrolytic solution 12.

[Preparation of Lithium Ion Capacitors]

A lithium ion capacitor was prepared according to the following procedure, utilizing the combinations of the positive electrodes and the electrolytes shown in Table 2.

(1) The positive electrode and the negative electrode were punched out to form a rectangle having a size of 60 mm×40 mm. Then, an area of 20 mm×40 mm of the coating in the region on one end of the long side was peeled off, leaving the coating having a size of 40 mm×40 mm. The current collecting tab was then attached.

(2) A laminate was prepared by arranging the coating portions of the positive electrode and the negative electrode to face each other and interposing a cellulose separator having a thickness of 20 μm therebetween.

(3) The laminate prepared in (2) and a metallic lithium foil for lithium pre-doping were encapsulated in an aluminum laminate foil. An electrolytic solution was injected into the aluminum foil. The aluminum foil was then sealed to prepare a lithium ion capacitor. Table 2 also shows the RED values for each combination of the positive electrode binder and the electrolytic solution.

TABLE 2

| | Positive electrode (Binder) | Electrolytic solution (Electrolytes) | RED value |
|---|---|---|---|
| Example 1 | A (Polyacrylic acid) | I(LiFSI) | 2.48 |
| Example 2 | A (Polyacrylic acid) | I2(LiFSI) | Greater than 1 |
| Example 3 | B (Acrylic acid ester) | I(LiFSI) | 0.21 |
| Example 4 | C(SBR) | I(LiFSI) | 0.61 |
| Example 5 | C(SBR) | P(LiPF$_6$) | 0.61 |

[Initial Performance Test]

After performing lithium pre-doping, charging, discharging, and aging for each lithium ion capacitor, the internal resistance and discharge capacity were measured at a room temperature (25° C.), cut off voltage of 2.2 to 3.8 V, and measurement current at 10 C to test the initial performance. The dope ratio was adjusted to 80 percent.

[Durability Test (85° C. Float Test)]

A lithium-ion capacitor cell for evaluation was connected to an external power supply to maintain the voltage at 3.8 V. It was then placed in a constant temperature bath of 85° C. for a certain time, which is referred to as the 85° C. and 3.8 V float time. After the lapse of this time, the lithium ion capacitor cell being evaluated was taken out of the constant temperature bath and cooled to the room temperature. Then, using the same conditions as the initial performance test described above, the internal resistance and discharge capacity were measured to determine the capacity retention rate (the percentage of the discharge capacity considering that the initial discharge capacity is 100 percent) and the increase of internal resistance (the rate of increase from the initial performance). The results are shown in Table 3.

TABLE 3

| | | 85° C., 3.8 V Float time (h) | | | | | | |
|---|---|---|---|---|---|---|---|---|
| | | 0 | 180 | 230 | 500 | 550 | 787 | 1000 |
| Example 1 | Capacity retention rate | 100% | 119% | | | 115% | | 93% |
| | Increase rate of internal resistance | 0% | 4% | | | 42% | | 283% |
| Example 2 | Capacity retention rate | 100% | | 105% | 104% | | 101% | 100% |
| | Increase rate of internal resistance | 0% | | 0% | 3% | | 11% | 15% |
| Example 3 | Capacity retention rate | 100% | 104% | — | — | — | — | — |
| | Increase rate of internal resistance | 0% | 438% | — | — | — | — | — |
| Example 4 | Capacity retention rate | 100% | | | 115% | | | 100% |
| | Increase rate of internal resistance | 0% | | | 297% | | | 1035% |
| Example 5 | Capacity retention rate | 100% | 48% | — | — | — | — | — |
| | Increase rate of internal resistance | 0% | 116% | — | — | — | — | — |

As can be seen from Table 3, when the lithium ion capacitor cell from example 5, where the electrolyte of the electrolytic solution is lithium fluoride phosphate, which is not an imide-based lithium salt, is exposed to a high temperature environment of 85° C., the capacity retention rate is approximately half after 180 hours of exposure. Whereas, in examples 1-4, where the electrolytic solution contains an imide-based lithium salt as the electrolyte, a high capacity retention rate was maintained for a long time. However, it has become clear from the experimental results that even if the electrolytic solution contains an imide-based lithium salt as the electrolyte, there is a difference in the increase of internal resistance depending on composition of the polymer used as the positive electrode binder. When the results are compared with regard to the RED values of the polymers for the positive electrode binder with respect to the electrolytic solution (see Table 2), it has been found that the increase of internal resistance was high for example 3, in which acrylic acid ester, whose RED value is less than one, was used, and for example 4, in which SBR, which also has a RED value less than one, was used. In contrast, in examples 1 and 2, the electrolytic solution contains an imide-based lithium salt as the electrolyte, and the polymer of the positive electrode binder was polyacrylic acid, whose RED value is greater than one with respect to the electrolytic solution. Accordingly, the polymer in the positive electrode binder is difficult to dissolve in the electrolytic solution. It has become clear that in these cases, a high capacity retention rate was maintained, and the increase of internal resistance was suppressed to be small, even when the capacitor was exposed to a high temperature environment of 85° C.

[Consideration of the Effects of Dope Percentage]

Next, the effects of dope ratio of the lithium ions $Li^+$ has been considered. The following test has been conducted with lithium ion capacitors of examples 6 to 8 prepared in the same manner as example 2. However, the pre-doping amount has been adjusted so that for example 6 the dope ratio was 80 percent, for example 7 the dope ratio was 90 percent, and for example 8 the dope ratio was 100 percent.

[Float Test]

Figure 10:
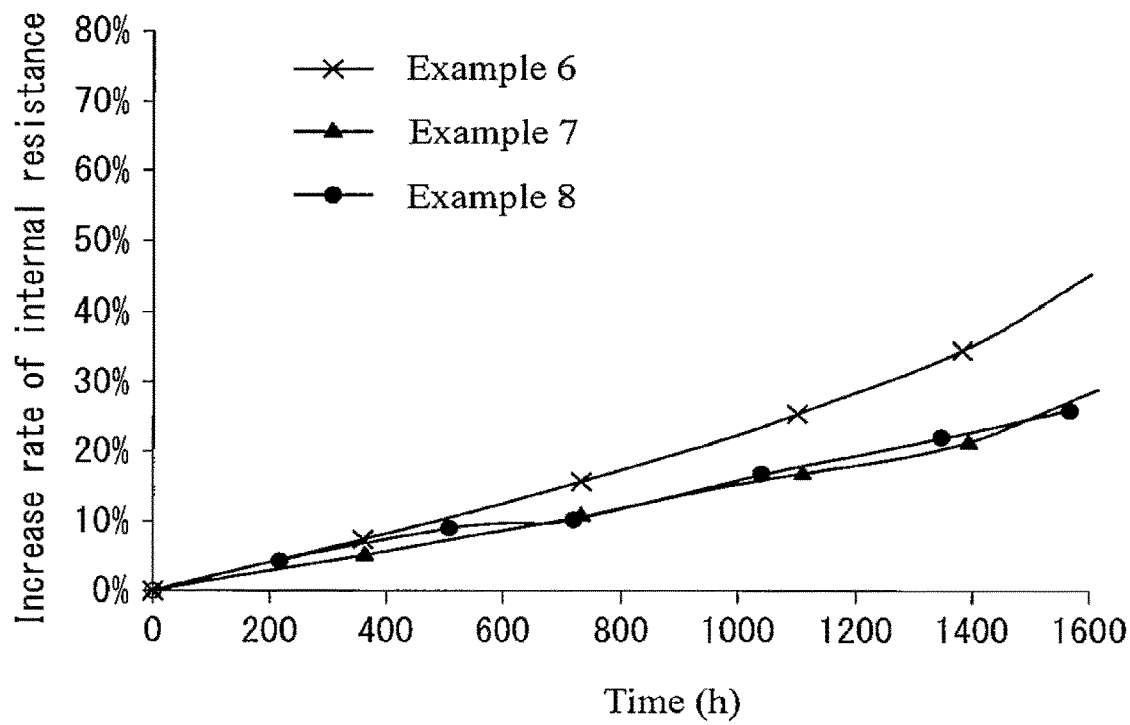
FIG. 10 is a graph showing temporal changes of the internal resistance of lithium ion capacitors of examples 6-8 at 85° C.
Figure 11:
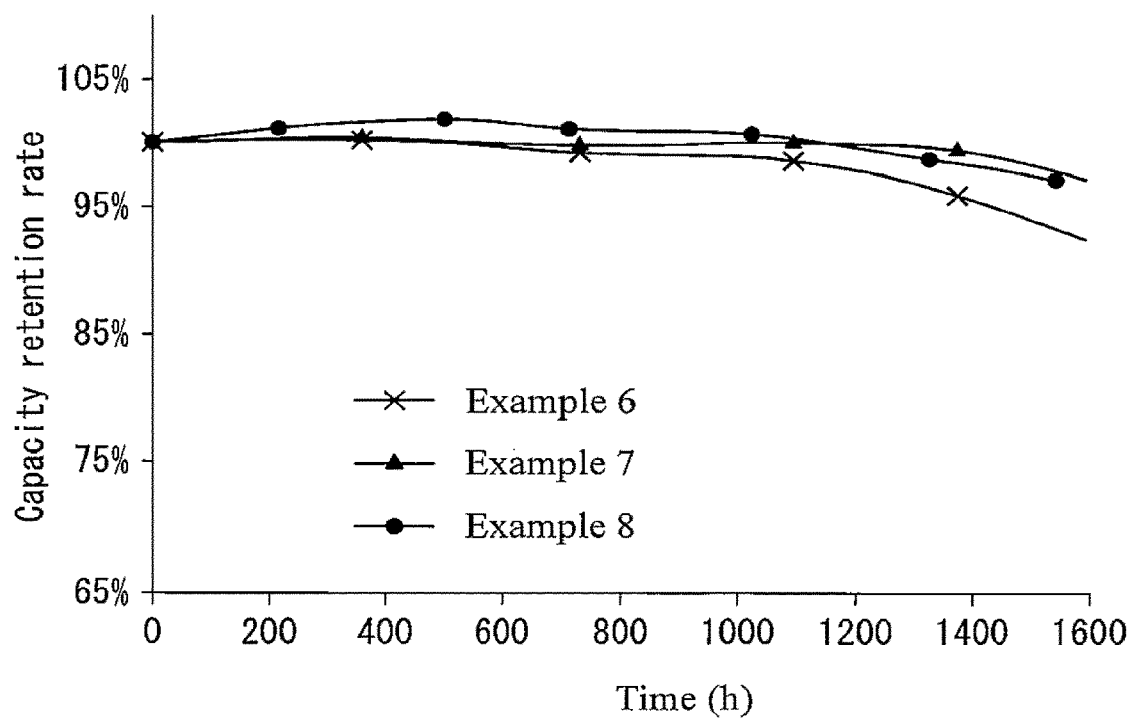
FIG. 11 is a graph showing temporal changes of the discharge capacity of the lithium ion capacitors of examples 6-8 at 85° C.

The initial internal resistance and discharge capacity were measured with the lithium ion capacitors at a room temperature (25° C.), cut-off voltage of 3.0 to 3.5 V, electricity current of 5 mA, 0.2 C. The internal resistance was measured using DC-IR method, measuring internal resistance (mΩ) at 0 to 0.1 seconds. Next, the lithium ion capacitors were retained at a voltage of 3.8 V using an external power supply. The lithium ion capacitors were left inside a constant temperature water bath set at 85° C. At predetermined times, each lithium ion capacitor was collected from the constant temperature water bath, restored to a room temperature, and had its battery performance tested as specified above. The increase of internal resistance for examples 6 to 8 is shown in FIG. 10. FIG. 11 shows the drop in discharge capacity for examples 6 to 8.

As shown in FIG. 10, after 1,600 hours, the increase of internal resistance was less than 50 percent for each of the lithium ion capacitor of examples 6 to 8. Also, as shown in FIG. 11, after 1,600 hours, the capacity retention rate was more than 85 percent for each of the lithium ion capacitor of examples 6 to 8. From these results, it has become clear that the lithium ion capacitors of examples 6 to 8 have heat resistance at 85° C. as well as high durability in such a high temperature environment. Further, examples 7 and 8 showed better results than example 6, with regards to the increase of internal resistance and the drop in discharge capacity. As a result, it has been discovered that it is preferable to have a dope ratio of 90 to 100 percent, rather than 80 percent.

The invention claimed is:

1. An alkali metal ion capacitor, comprising:
a positive electrode active material which adsorbs and desorbs alkali metal ions;
a positive electrode binder which binds the positive electrode active material;
a negative electrode active material which stores and releases the alkali metal ions;
a negative electrode binder for binding the negative electrode active material; and
an electrolytic solution containing an organic solvent and an imide-based alkali metal salt, wherein:
the negative electrode active material is pre-doped with the alkali metal ions, the positive electrode binder has a relative energy difference (RED) value greater than 1, based on the Hansen solubility parameter, relative to the electrolytic solution, and
a dope ratio of the negative electrode active material is 90% to 100%, wherein
the dope ratio is defined as follows:

$$\text{dope ratio } (\%) = Z/Zt \times 100$$

wherein Z is an amount of alkali metal ions stored in the negative electrode active material when fully charged, and Zt is an amount of alkali metal ions which could be stored in the negative electrode active material in a non-predoped state.

2. The alkali metal ion capacitor of claim 1, wherein:
the alkali metal ions are lithium ions, and
the imide-based alkali metal salt is an imide-based lithium salt.

3. The alkali metal ion capacitor of claim 2, wherein the organic solvent does not comprise dimethyl carbonate.

4. The alkali metal ion capacitor of claim 2, wherein at least one of the positive electrode binder and the negative electrode binder is polyacrylic acid.

5. The alkali metal ion capacitor of claim 1, wherein an amount the negative electrode active material is pre-doped with the alkali metal ions is less than or equal to a maximum capacity of alkali metal ions that could be stored in the negative electrode active material minus a maximum capacity of the alkali metal ions that could be adsorbed on the positive electrode active material.

6. The alkali metal ion capacitor of claim 5, wherein the RED value of the positive electrode binder with respect to the electrolytic solution is greater than 1 at 85° C.

* * * * *